(12) United States Patent
Lefaure

(10) Patent No.: US 8,417,419 B2
(45) Date of Patent: Apr. 9, 2013

(54) DEVICE AND PROCESS FOR AUTOMATIC LOCKING OF A STEERING COLUMN

(75) Inventor: Philippe Lefaure, Montbrun Lauragais (FR)

(73) Assignee: LDL Technology S.A.S., Ramonville Saint Agne (FR)

( * ) Notice: Subject to any disclaimer, the term of this patent is extended or adjusted under 35 U.S.C. 154(b) by 365 days.

(21) Appl. No.: 12/904,178

(22) Filed: Oct. 14, 2010

(65) Prior Publication Data

US 2011/0125370 A1    May 26, 2011

(30) Foreign Application Priority Data

Oct. 16, 2009 (FR) ..................................... 09 57293

(51) Int. Cl.
*B62H 5/06* (2006.01)
*B60R 25/02* (2006.01)
*B62D 1/184* (2006.01)

(52) U.S. Cl.
USPC .................................. 701/41; 70/186; 70/233

(58) Field of Classification Search ..................... 701/41
See application file for complete search history.

(56) References Cited

U.S. PATENT DOCUMENTS 2,617,288 A * 11/1952 Hinds .............................. 70/233
2,625,813 A * 1/1953 Hinds .............................. 70/185
8,099,986 B2 * 1/2012 Takeuchi et al. ................ 70/186
2007/0214849 A1 * 9/2007 Yoshitake et al. ........... 70/278.3
2008/0290998 A1 * 11/2008 Ramirez et al. .......... 340/426.11

* cited by examiner

*Primary Examiner* — Shelley Chen
(74) *Attorney, Agent, or Firm* — Jackson Patent Law Office

(57) ABSTRACT

The invention relates to a device for locking (D) the steering column of a motorcycle (M), which includes a first module (200) secured to the rotating column and a second module (100) secured to the frame of the vehicle (M), which is stationary with respect to said column,
  said frame mechanically limiting the angular amplitude of rotation of said column,
  a module (200) including a locking bolt (211) projecting toward the other module (100), and the other module (100) including two flat bolts (110) projecting toward the other module (200). Said device is remarkable in that the two flat bolts (110) are arranged at the two ends of the angular course defined by said frame, so as to create an area of operation without possible locking between said two flat bolts (110),
  a locking area at each end of the angular course so that said locking bolt (211) can reach the end of the angular course and the corresponding locking area only in the retracted position of the locking bolt (211) or the flat bolts (110),
  and the deployment of said locking bolt (211) or the flat bolts (110) in the area of operation defined between the two flat bolts (110) prevents said locking bolt (211) from passing into the locking area during normal operation of the vehicle.
The invention also relates to a process of operation of said device.

8 Claims, 7 Drawing Sheets

DEVICE AND PROCESS FOR AUTOMATIC LOCKING OF A STEERING COLUMN

FIELD OF APPLICATION OF THE INVENTION

This invention relates to the field of electronics on board vehicles in the broad sense (examples: motorcycles, boats, public works and civil engineering machines, etc.) and in particular to adaptations enabling the steering systems of such vehicles to be locked under the best conditions.

DESCRIPTION OF THE PRIOR ART

Antitheft devices for locking the steering column, which are controlled and slaved by electronic solutions, currently exist in the motor vehicle sector.

These assemblies combining mechanical and electronic features are very complex and generally have a multi-notch locking system, meaning that, in the parking position, i.e. once the locking device has been activated, the steering column can be locked at about every five (5) degrees of movement of rotation of said column.

These systems are difficult to implement on motorcycles, because a locking defect can then appear every five (5) angle degrees and thus lock the position of the handlebars, which, on a two-wheel vehicle, results in an accident, regardless of the speed of the vehicle.

To overcome this problem associated with an application in motorcycles, and, even though electronics these days play a considerable role in vehicle equipment, the existing processes and devices have been designed to require a so-called active push-pull or rotation action in order to release the column lock from its mechanical deadlock. This process has a number of advantages, among which:

- it ensures the execution of this operation by the user, who is required to consciously perform this manipulation in order to be capable of driving the vehicle,
- the forces necessary for unlocking do not require additional battery energy by an actuator in order to retract said lock,
- the action is based on logic and action alone by the driver, and not on a programmed electronic system that should ensure the stability of the unlocking during driving phases,
- etc.

Nevertheless, insofar as the unlocking must be performed by a "manual" action, without requiring an identification phase, it is difficult to ensure that said unlocking is performed by the correct user.

DESCRIPTION OF THE INVENTION

In view of the above, the applicant conducted research with the objective of finding a fully automated solution for locking the steering column, in particular for a two-wheel vehicle, while ensuring maximum safety of use, i.e. minimizing the consequences resulting from a defect in the software or electronic control capable of activating the locking.

This research led to the design and production of a device and a work process combining mechanical and electronic subassemblies that are particularly simple to implement and satisfying the objectives of the invention.

According to the invention, the device for locking the steering column of a motorcycle, which includes a first module secured to the rotating column and a second module secured to the frame of the vehicle, which is stationary with respect to said column, said frame mechanically limiting the angular amplitude of rotation of said column, a module including a locking bolt projecting toward the other module, the other module including two flat bolts projecting toward the other module, the locking bolt or the pair of flat bolts capable of moving between a deployed position so as to create an obstacle over the course of angular movement of the other module for the purpose of locking or prevent the movement of the latter and a retracted position so as to allow the latter to move, is remarkable in that:

said locking bolt or the pair of flat bolts is caused to move by an actuator controlled by a unit communicating with a hands-free subassembly by a wire connection or by a radiofrequency connection, the two flat bolts are arranged at the two ends of the angular course defined by said frame, so as to create:

an area of operation without possible locking between said two flat bolts, a locking area at each end of the angular course defined by said frame, in which the locking area is defined by the space between the flat bolt and the end of the angular course, so that said locking bolt can reach the end of the angular course and the corresponding locking area only in the retracted position of the locking bolt or the flat bolts, and the deployment of said locking bolt or the flat bolts in the area of operation defined between the two flat bolts prevents said locking bolt from passing into the locking area during normal operation of the vehicle.

This feature is particularly advantageous in that it avoids the need for a multi-notch locking system and in particular avoids the disadvantages thereof in a two-wheel vehicle application. Indeed, this process positions the locking areas at the ends of the angular range of rotation of the column and prevents access to these locking areas during normal operation.

Thus, in the controlled retracted position, the locking bolt or the flat bolts allow the movement of the steering column over the entire angular range. Indeed, the retraction of said locking bolt or the flat bolts enables the passage from one area to another by allowing the locking bolt to pass in spite of the obstacle formed by the strike plate.

In the resting deployed position, the locking bolt or the flat bolts prevent the steering column from going over the angular areas corresponding to the locking, or prevent the movement of the steering column over the angular area of operation. Given that the operation of the device is dependent on the angular position of the steering column, the device is equipped with a sensor for rotation of the column enabling the area where the locking bolt is located to be defined.

Such a device makes it possible to envisage an automation of the locking on a two-wheel vehicle, in accordance with the objectives of the invention. Indeed, the locking can be performed only at the ends of the steering course, i.e. for a two-wheel vehicle at a stopping phase or during a very low-speed maneuver. In addition, the defective deployment of the locking bolt does not have the negative effects of potential locking of the steering system over the entire angular range.

The defective retraction merely enables the lock to be released and does not result in a situation that could cause an accident.

To manage this automation, the device of the invention has other features, associated or not, among which:

the hands-free subassembly consists of a unit combining functions of identification and authentication of the user wearing a badge or a unique identifier worn by the user of the vehicle, communicating with the subassembly in order to identify the user via a radiofrequency connection, it comprises an engine computer that, managing the vehicle engine and allowing or not allowing the engine to be started, communicates with the subassembly, which transmits the authorization to start the engine via the computer, after authentication of the unique identifier by the hands-free subassembly, it comprises an alarm module, which detects a vehicle theft attempt and communicates with the computer in order to suspend possible use of the engine or activate visual and sound alarms of the vehicle, it comprises a start button of which the activation by the user starts the procedure of identification of the badge wearer, so as to unlock the steering column or not and start the engine, it comprises means for measuring speed, in which the information corresponding to a value close to a stop enables the deployment of the locking bolt or the flat bolts to be authorized.

The user has on his or her person an electronic card (or any biometric identifier: fingerprints, iris, etc.) identifying him or her, optionally by radiofrequency transmission, by means of the computer on board the vehicle, which will or will not authorize access and starting of said vehicle.

The invention also relates to the process of operation of a device as described above. According to a particularly advantageous feature, a locking process consists of the following steps:

detection of a long pressing action applied to the start button,
measurement of the speed, and whether the speed is close to zero,
stopping of the engine,
detection of the movement of the steering column within a limited time after the engine has been stopped,
retraction of the locking bolt or flat bolts,
measurement of the detected angular movement and detected angular amplitude of rotation determined to be sufficient,
deployment of the locking bolt or flat bolts.

According to another particularly advantageous feature of the invention, an unlocking process consists of the following steps:

detection of a brief pressing action applied to the start button,
identification of the user,
retraction of the locking bolt or flat bolts at least for a limited time,
detection of the movement of the steering column within a limited time after the engine has been stopped,
measurement of the detected angular movement and detected angular amplitude of rotation determined to be sufficient,
deployment of the locking bolt or flat bolts for active limitation of the unlocked area,
starting of the engine.

This automation enables a global access and starting system that does not involve a mechanical key to be proposed.

Of course, this locking and this unlocking may also be performed actively by the intervention of the user, as the invention is focused on reducing the consequences of defective activation of the lock. The locking system involving locking of the steering column proposed by the invention can be triggered actively (requiring human intervention, in general by an action on a button, or a key if the key is still part of the device), or passively (i.e. without conscious human intervention, for example as the driver simply moves away).

As the fundamental concepts of the invention have been disclosed above in their most basic form, other details and features will become clearer in view of the following description and the appended drawings, provided for non-limiting purposes, of a number of embodiments of a device according to the invention.

DESCRIPTION OF PREFERRED EMBODIMENTS

Figure 1:
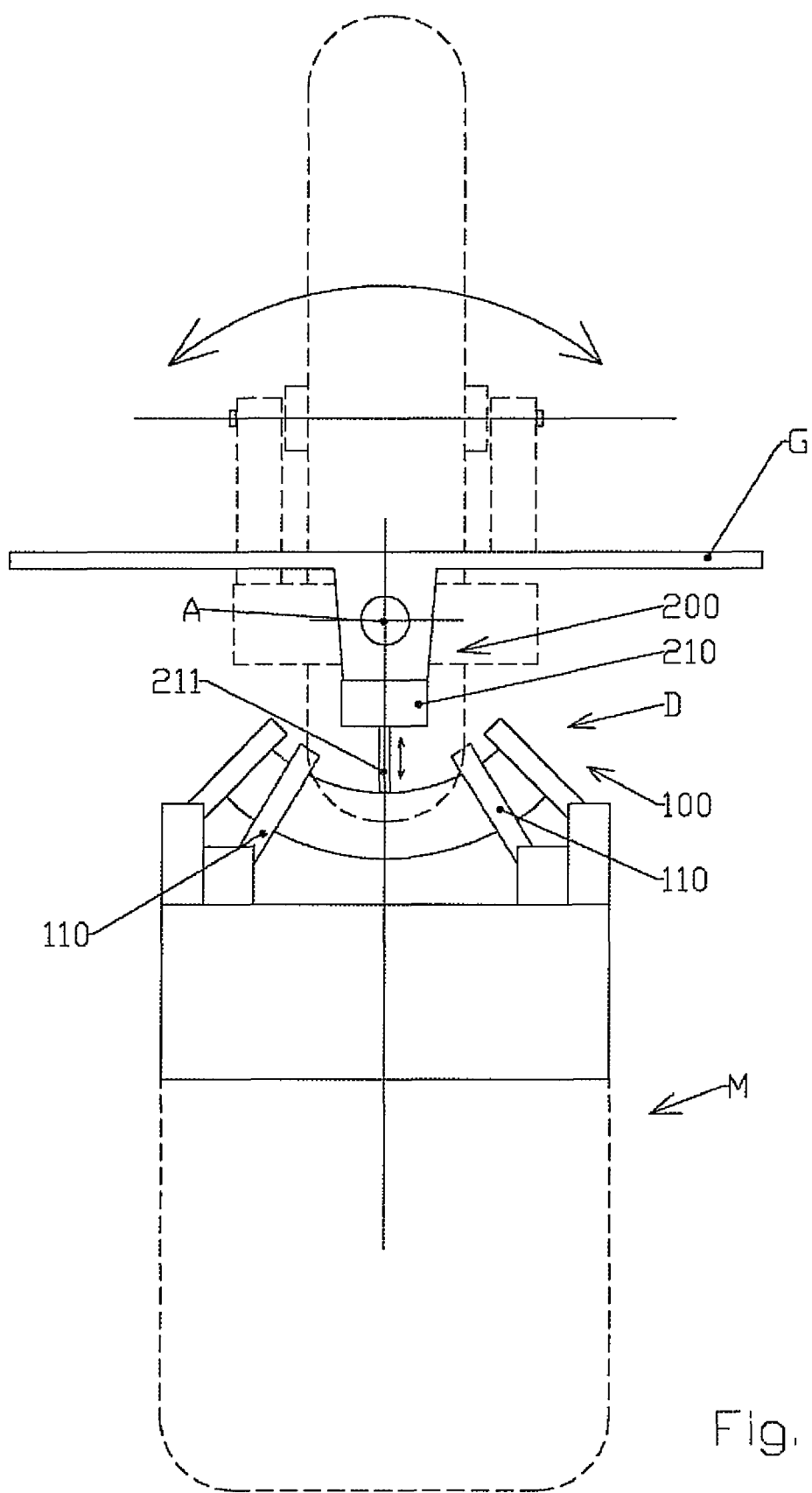
FIG. 1 is a diagrammatic drawing of a top view of an embodiment of a device of the invention installed on a motorcycle.

As shown in the drawing of FIG. 1, a locking device according to the invention and referenced D as a whole is provided in the steering column of a motorcycle M. The pivot axis of the handlebars G is symbolized by point A.

As shown, the device D includes a stationary module 100 secured to the frame of the motorcycle M and a mobile module 200 secured to the handlebars G. This mobile module 200 follows the rotation of the handlebars G about the axis A according to an angular displacement defined by the structural features of the motorcycle.

According to the invention, the rotating module 200 is equipped with an actuator 210 ensuring, according to a translation movement perpendicular to the axis A, the deployment or retraction of a locking bolt 211. This locking bolt, depending on whether it is deployed or retracted, provides a bearing surface for stops or flat bolts 110 secured to the stationary portion 100 for the purpose of mechanical blocking of the rotation movement. Thus, when said locking bolt 211 is retracted, the steering column is not subjected to any limitation, whereas, when it is deployed, the rotation of the steering column and therefore the handlebars G is limited by the arrangement of said stops and the position of the locking bolt 211 at the time of deployment thereof.

According to the invention, the stops or flat bolts 110 are arranged at the two ends of the angular course of the handlebars G about the axis A so that the locking bolt does not completely block the steering system unless it is located at one of said ends.

In the angular course portion arranged between the two angular stops or flat bolts 110, the locking bolt 211 can be deployed without the steering system being locked. Another technical effect is that the deployment of the locking bolt in this area prevents the steering column and therefore the mobile module from coming into the locking areas due to the presence of said stops or flat bolts 110.

Thus, these stops or flat bolts 110 have a dual function. A first function consists of locking the steering column once the locking bolt has been deployed in the locking area defined at each end of the angular course between said end and the flat bolt. Another function consists of preventing said locking bolt from coming into the locking areas once it has been deployed in the angular space separating the two stops 110.

The device D of the invention functions on the basis of a preferred embodiment in which the locking bolt is deployed in the resting position and in which it is retracted on the command of an actuator secured to the mobile module 200.

Figure 2:
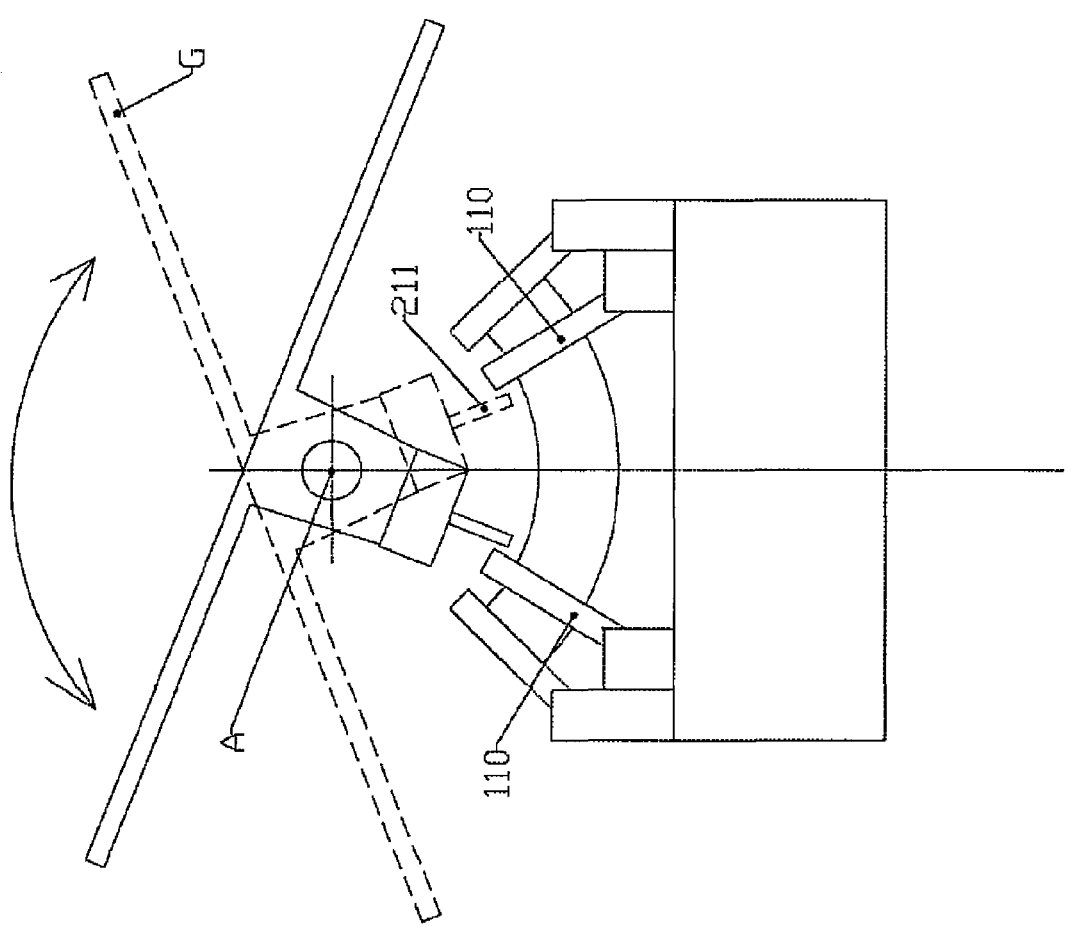
FIGS. 2 to 5 show the possibilities for movement and unlocking of the steering column of the motorcycle.

As shown in the drawing of FIG. 2, the locking bolt 211 is deployed between the two stops or flat bolts 110 and enables the handlebars G to be used according to the angular range defined by said stops 110.

Figure 3:
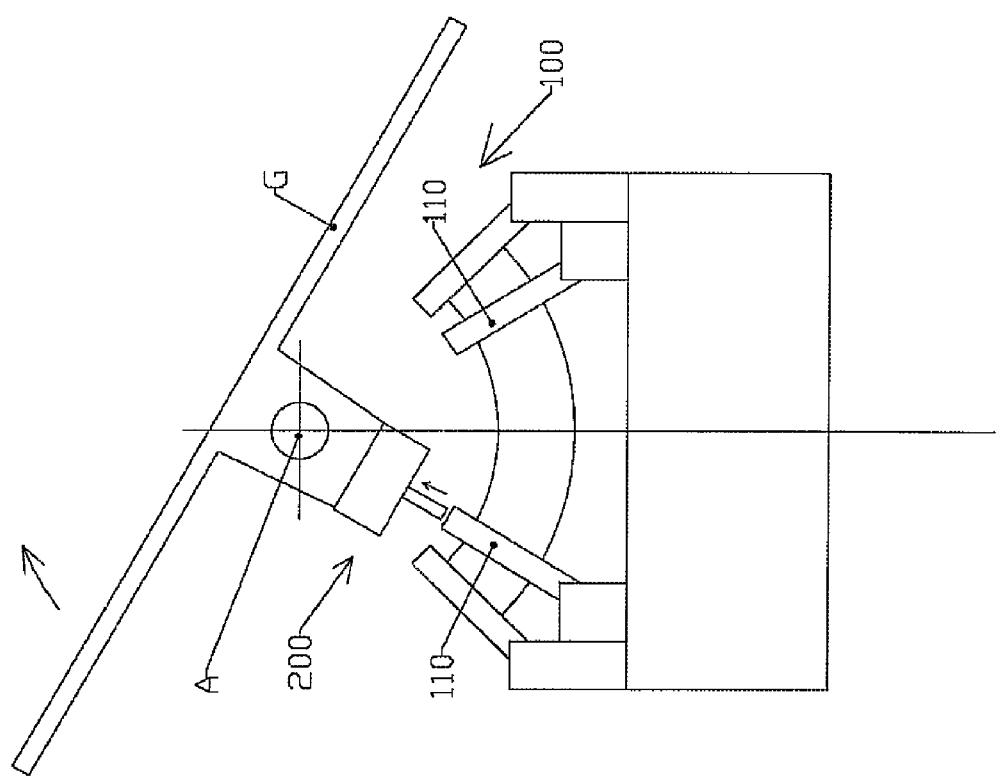
Figure 4:
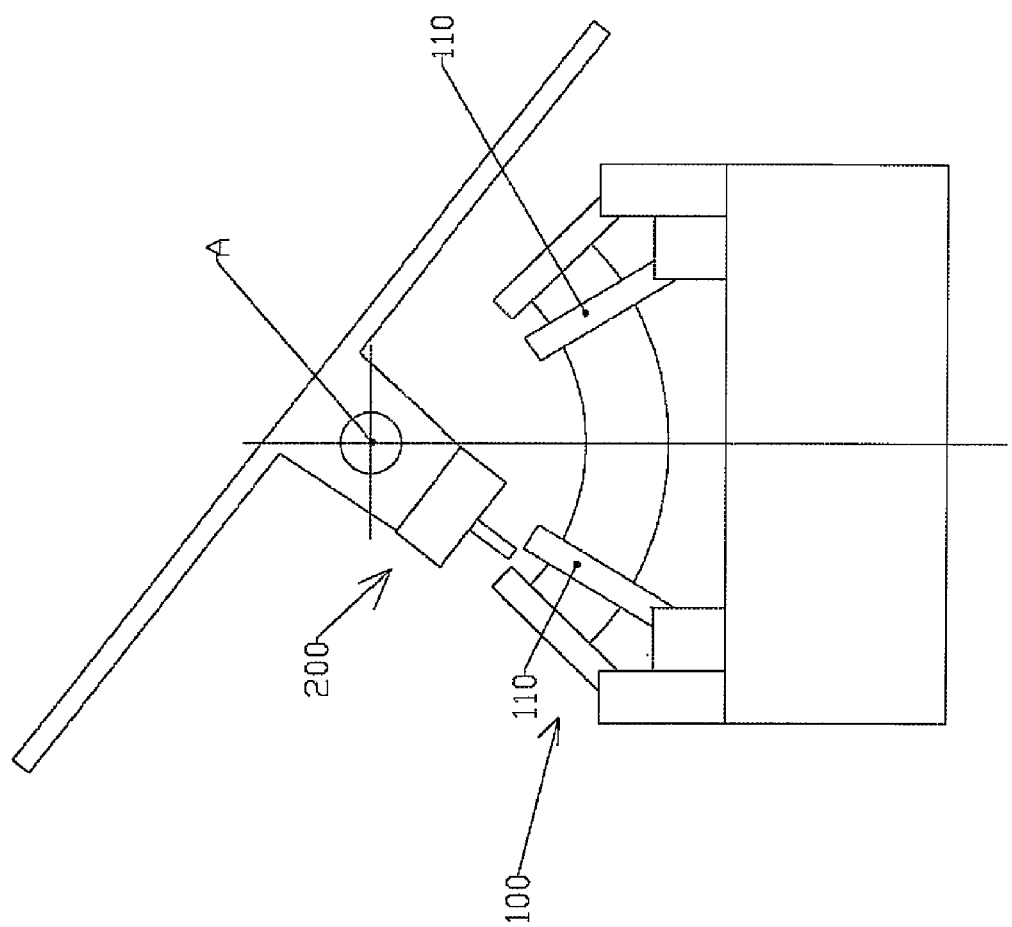

To enable the steering column to be locked, the module ordering the movement of the locking bolt 211 is controlled so as to retract said locking bolt 211 as shown in the drawing of FIG. 3 and enable it to pass into one of the two locking areas located at the ends of the angular range of movement of the handlebars Gas shown in the drawing of FIG. 4.

Figure 5:
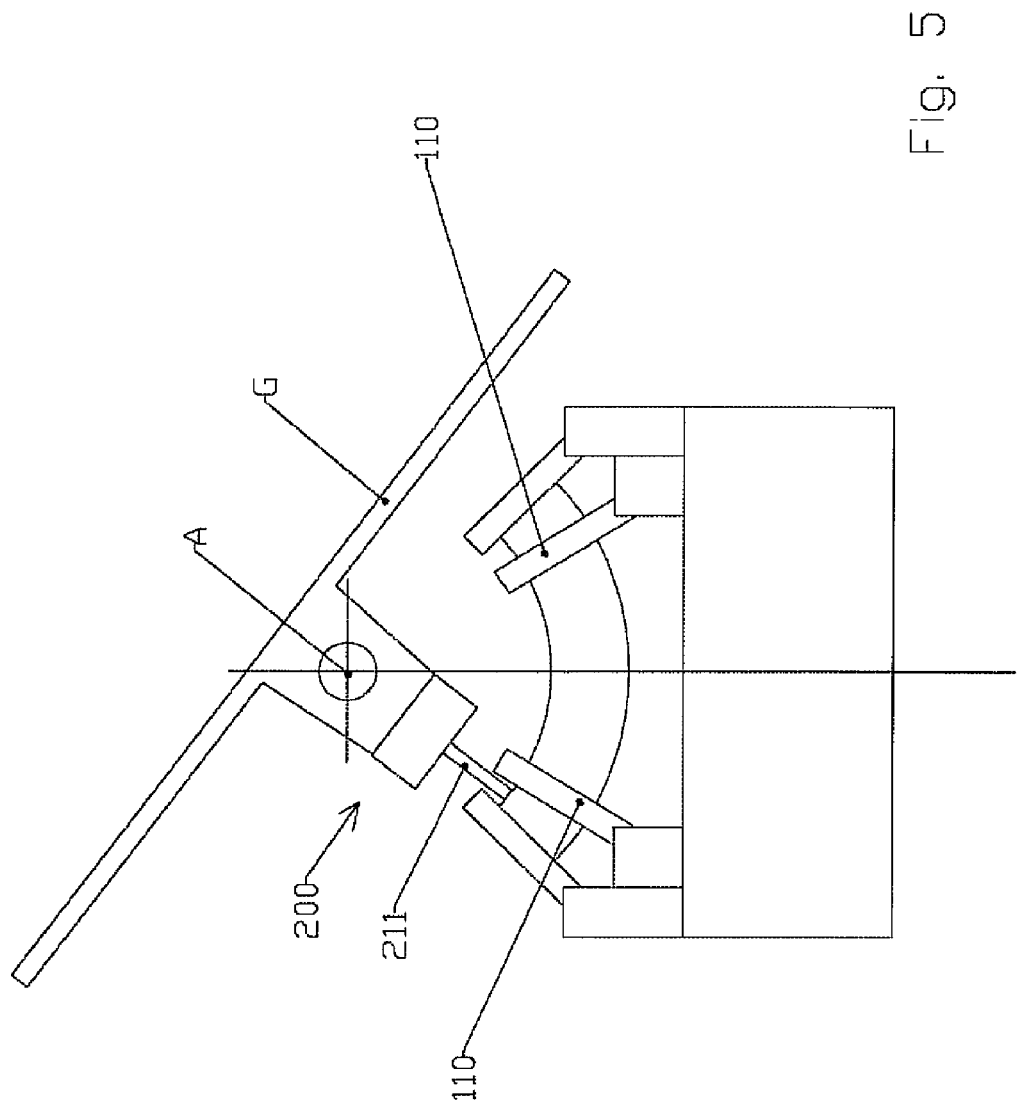

The actuator ordering the retraction is then controlled so as to authorize the deployment of the locking bolt 211 and enable the projection thereof, providing a bearing surface against the angular stop or flat bolt, and which blocks the steering system between the end of its angular displacement and the stop 110 as shown by the drawing of FIG. 5.

Only the order to retract the locking bolt and the rotation of the handlebars will enable the steering system to be released.

Figure 6:
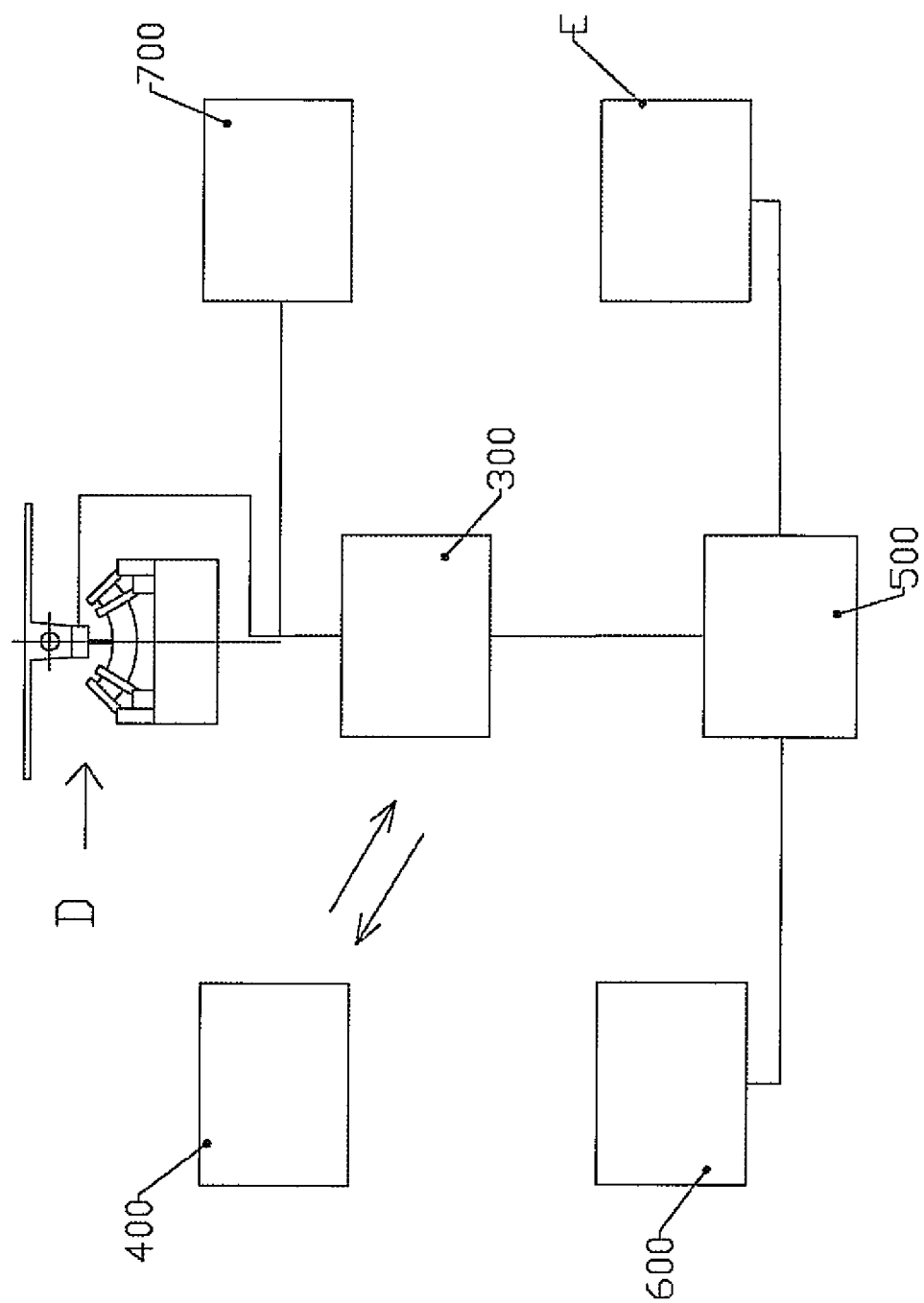
FIG. 6 is a diagram showing the various subassemblies of the device or the environment of the device involved in the control thereof.

As shown in the drawing of FIG. 6, the locking and ignition device command device has a plurality of subassemblies, including:
- the locking device D, which commands the mobility of the locking bolt for the purposes of locking and unlocking the steering column;
- a hands-free subassembly 300 communicating with the device D (the intelligence of the locking system can be on localized demand in the device D or in the subassembly 300) by a wire connection or by a radiofrequency connection. This hands-free subassembly 300 can consist of a unit potentially combining preexisting functions such as tire pressure monitoring, the identification and authentication of the user wearing a badge or a unique identifier;
- a unique identifier 400 worn by the user of the vehicle, communicating with the subassembly 300 in order to identify the user via a radiofrequency connection;
- an engine computer 500, which manages the engine E and therefore authorizes the starting of the engine. This computer communicates with the subassembly 300, which transmits the authorization to start the engine via the computer, after authentication of the unique identifier 400 by the hands-free subassembly 300;
- an optional alarm module 600, which detects a vehicle theft attempt and communicates with the computer in order to suspend possible use of the engine. The computer 500 can also transmit the order to the subassembly 300 to trigger visual and sound alarms (flashing lights, horn);
- a start button 700, which can be the standard start button, and which, when pressed, starts the procedure of identification of the badge wearer, and, eventually results in the unlocking of the steering column and the starting of the engine E.

Numerous strategies for using this parameterizable system are possible, for example, a first simple pressing action on the button 700 can unlock the column without starting the engine E (which authorizes pushing maneuvers in order to move the vehicle) and then another pressing action will start the engine. Similarly, a longer or shorter pressing action will be interpreted differently, and can unlock the column, start the engine E or turn off the engine, or re-lock the column, and so on.

The global mechatronic system performing the unlocking of the steering column can work according to the following sequence:

1—a brief press on the button 700 by the user to start the identification process for unlocking and finally starting, 2—identification of the user (encrypted dialogue between the vehicle by means of the subassembly 300 and the user via the unique identifier 400 (badge, typed code or biometric verification), 3—an actuator retracts the mechanical lock or locking bolt 211 for a defined time period, 4—the user turns the steering system so as to leave the locking system area, 5—once out of this area (the subassembly is informed by a rotation indicator), the actuator then releases the locking bolt 211, which moves into a resting position in a defined rotation area between said two stops 110 (this latter point is also possible with the use of a bi-stable actuator, which ensures the non-movement of the lock during driving), 6—the engine can be started.

According to the embodiment in which the speed V of the vehicle is measured, the system can function as follows:

1—long pressing action on the button 700 and V=0,

2—engine stopped,

3—handlebars are pivoted into an extreme position for a defined locking bolt retraction time period, 4—if the extreme position is reached, the locking bolt is released and deployed.

Figure 7:
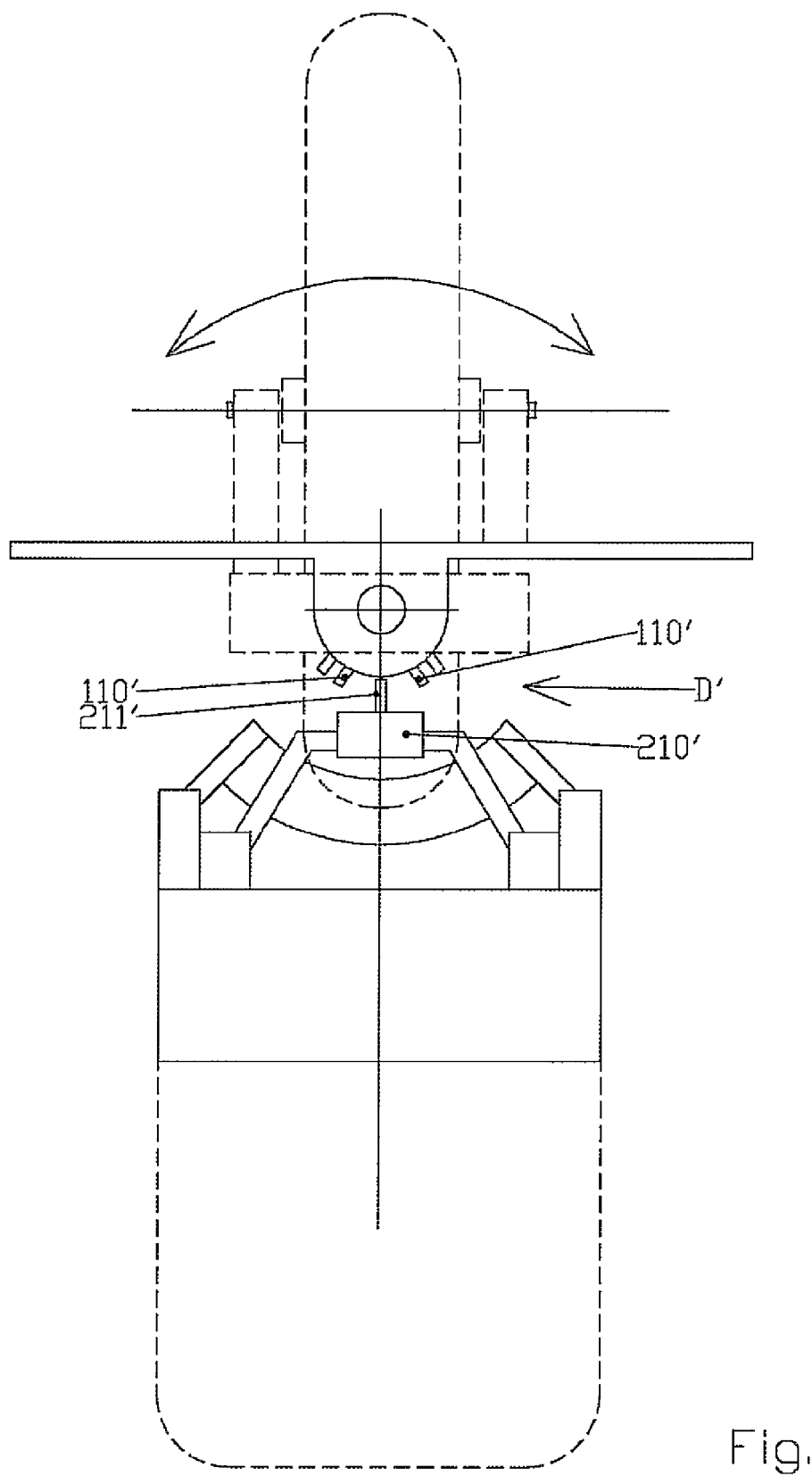
FIG. 7 is a diagrammatic drawing of a top view of another embodiment of a device according to the invention.

Another embodiment of a device D' is shown by the drawing of FIG. 7 in which the module attached to the steering column does not contain any electronics. In this embodiment, the unit 210' ordering the deployment and the retraction of the locking bolt 211' are secured to the stationary frame while the mobile steering column receives the stationary flat bolts 110'. Of course, the rest of the device and the process remain identical to those described above.

It is understood that the process and the device have been described above and shown for the purpose of disclosure rather than limitation. Of course, various arrangements, modifications and improvements may be applied to the example above, without going beyond the scope of the invention.

Thus, for example, according to another embodiment, the flat bolts are mobile and the deployment and the retraction are managed by the on-board electronics, while the locking bolt remains stationary. In addition, the term motorcycle must be understood as encompassing any vehicle with handlebars and in particular snowmobiles.

The invention claimed is:

1. A device for locking the steering column of a motorcycle, which includes a first module secured to the rotating column and a second module secured to the frame of the vehicle, which is stationary with respect to said column,
    said frame mechanically limiting the angular amplitude of rotation of said column,
    a module including a locking bolt projecting toward the other module,
    the other module including two flat bolts projecting toward the other module,
    the locking bolt or the pair of flat bolts capable of moving between a deployed position so as to create an obstacle over the course of angular movement of the other module for the purpose of locking or prevent the movement of the latter and a retracted position so as to allow the latter to move,
    characterized in that:
    said locking bolt or the pair of flat bolts is caused to move by an actuator controlled by a unit communicating with a hands-free subassembly by a wire connection or by a radiofrequency connection, the two flat bolts are arranged at the two ends of the angular course defined by said frame, so as to create:
an area of operation without possible locking between said two flat bolts,
a locking area at each end of the angular course defined by said frame, in which the locking area is defined by the space between the flat bolt and the end of the angular course,
so that said locking bolt can reach the end of the angular course and the corresponding locking area only in the retracted position of the locking bolt or the flat bolts,
and the deployment of said locking bolt or the flat bolts in the area of operation defined between the two flat bolts prevents said locking bolt from passing into the locking area during normal operation of the vehicle.

2. A device according to claim 1, characterized in that it is equipped with a sensor for rotation of the column enabling the area where the locking bolt is located to be defined.

3. A device according to claim 1, characterized in that it comprises means for measuring the speed, in which the information corresponding to a value close to a stop enables the deployment of the locking bolt or the flat bolts to be authorized.

4. A device according to claim 2, characterized in that the hands-free subassembly comprises a unit combining functions of identification and authentication of the user wearing a badge or a unique identifier worn by the user of the vehicle, communicating with the subassembly in order to identify the user via a radiofrequency connection.

5. A device according to claim 4, characterized in that it comprises an engine computer that, managing the engine of the vehicle and allowing or not allowing the engine to be started, communicates with the subassembly, which transmits the authorization to start the engine via the computer, after authentication of the unique identifier by the hands-free subassembly.

6. A device according to claim 4, characterized in that it comprises a start button of which the activation by the user starts the procedure of identification of the badge wearer, so as to unlock the steering column or not and start the engine.

7. A process of operation of a device, according to claim 6, characterized in that it comprises the following steps:
detection of a long pressing action applied to the start button,
measurement of the speed, and whether the speed is close to zero,
stopping of the engine,
detection of the movement of the steering column within a limited time after the engine has been stopped,
retraction of the locking bolt or flat bolts,
measurement of the detected angular movement and detected angular amplitude of rotation determined to be sufficient,
deployment of the locking bolt or flat bolt.

8. A process of operation of a device, according to claim 6, characterized in that it comprises the following steps:
detection of a brief pressing action applied to the start button,
identification of the user,
retraction of the locking bolt or flat bolts at least for a limited time,
detection of the movement of the steering column within a limited time after the engine has been stopped,
measurement of the detected angular movement and detected angular amplitude of rotation determined to be sufficient,
deployment of the locking bolt or flat bolts,
starting of the engine.

* * * * *